(12) United States Patent
Cheng

(10) Patent No.: US 8,403,351 B2
(45) Date of Patent: Mar. 26, 2013

(54) EXTERNAL BICYCLE STAND

(76) Inventor: Wen-Jui Cheng, Chiayi County (TW)

( * ) Notice: Subject to any disclaimer, the term of this patent is extended or adjusted under 35 U.S.C. 154(b) by 358 days.

(21) Appl. No.: 12/823,429

(22) Filed: Jun. 25, 2010

(65) Prior Publication Data

US 2011/0316252 A1 Dec. 29, 2011

(51) Int. Cl.
*B62H 1/08* (2006.01)
(52) U.S. Cl. ........................................................ 280/294
(58) Field of Classification Search .................. 248/371, 248/371.2, 188.1, 188.6, 188.8, 298.1, 424, 248/429, 688, 292.12, 445, 231.61, 168, 248/127; 280/294, 293; 403/116
See application file for complete search history.

(56) References Cited

U.S. PATENT DOCUMENTS

| 444,258 | A | * | 1/1891 | Tillinghast | 280/294 |
| 586,629 | A | * | 7/1897 | Simonis | 280/294 |
| 654,452 | A | * | 7/1900 | Haven | 280/294 |
| 1,364,407 | A | * | 1/1921 | Palmer et al. | 280/294 |
| 4,563,017 | A | * | 1/1986 | Kimball | 280/294 |
| 6,237,929 | B1 | * | 5/2001 | Kielland | 280/294 |
| 7,089,604 | B2 | * | 8/2006 | Wright et al. | 4/252.1 |
| 8,262,116 | B2 | * | 9/2012 | Cheng | 280/294 |
| 2006/0231512 | A1 | * | 10/2006 | Mielke | 211/17 |
| 2010/0201099 | A1 | * | 8/2010 | Teng | 280/294 |
| 2011/0012322 | A1 | * | 1/2011 | Cheng | 280/294 |

* cited by examiner

*Primary Examiner* — Tony H. Winner
*Assistant Examiner* — Daniel Yeagley
(74) *Attorney, Agent, or Firm* — Rosenberg, Klein & Lee

(57) ABSTRACT

This invention relates to an external bicycle stand in which an axle is inserted in the stand body, a locating member for locating the axle being assembled on the stand body, an assembling member engaged with bicycle pedal being fastened on one end of the axle extending to the outside of the stand body, and a support member being pivotably hinged on the stand body. In bicycle parking, the assembling member is combined with the bicycle pedal, then the stand body supports under the pedal and in turn the support member pivotably hinged on the stand body can be moved down vertically to support on ground so as to finish the parking effect. This invention is adaptable to the cases having pedal of various sizes by providing a stand locating member capable of adjustment.

19 Claims, 8 Drawing Sheets

EXTERNAL BICYCLE STAND

BACKGROUND OF THE INVENTION

1. Field of Invention

This invention relates to an external bicycle stand, more particularly to a bicycle stand separately assembled on bicycle pedal for bicycle parking.

2. Brief Description of the Prior Art

Bicycle is becoming from just one of short-range transportation means to an indispensable traffic means accompanying with the oil price upsurging and the concept escalation of taking exercise or keeping in good health. As bicycle is driven by manual force of stamping, not only oil consumption and air pollution can be reduced but also improvement on bicycle rider's health can be achieved. Furthermore, as bicycle-riding is a good exercise and a recreation in leisure time as well, it is prevailing as a common practice for leisure.

Bicycle has to be parked properly when a bicycle rider reaches his destination or needs to take a break after a certain distance of riding. In order to avoid wearing or damage caused by the contact between bicycle body and ground, bicycle stand has to be used to support the bicycle body so as to maintain the bicycle in upright state.

Conventional bicycle stand is pre-assembled on bicycle body in most cases, which is a support rod actuated by an elastic element to control it swinging up and down. However, the elastic element is liable to become loosened after usage a period of time. Moreover, the support rod of the bicycle stand is liable to move down suddenly by itself due to the jolting and vibration caused by riding on rough road on the way of bicycle driving. In such case, bicycle rider may be endangered easily.

In view of the disadvantages of above conventional bicycle stand, the inventor of this invention hereby proposes a novel bicycle stand after endless endeavor with an intension to improve and upgrade the conventional bicycle stand based on his abundant knowledge and experience in product development and manufacturing.

SUMMARY OF THE INVENTION

This invention relates to an external bicycle stand, the main purpose of which is to provide a bicycle stand separately assembled on bicycle pedal in bicycle parking so as to achieve the purpose of parking bicycle and to improve safety in riding as well.

In order to achieve above objects, the inventor of this invention proposes an external bicycle stand, comprising:

a stand body, having a guiding groove provided thereon and an arc portion for fixing provided on one end of the guiding groove, an axle bore provided throughout the stand body from its front end to rear end being communicated with the guiding groove;

an axle penetrated through the axle bore of the stand body, a retaining pin being provided on the axle for fitting correspondingly in the guiding groove of the stand body;

a locating member disposed on a surface of the stand body having the guiding groove formed thereon, which includes an adjustment block having an elongate slot and a fastener locked in the elongate slot so as to fasten the adjustment block to the stand body;

an assembling member, including a coupling piece and a pin in which one end of the coupling piece is connected with the axle and the axle is fastened by a fastening member onto the coupling piece, and in which the other end of the coupling piece is inserted with a pin of polygonal shape;

a support member, being opposite to the assembling member and being pivotably hinged to the other end of the stand body, an abutment portion being formed on the upper edge of the support member, two support legs capable of telescopic adjustment being in threaded engagement on the bottom edge of the support member.

In bicycle parking, the assembling member is combined with the bicycle pedal, then the stand body supports under the pedal and in turn the support member pivotably hinged on the stand body can be moved down vertically to support on ground so as to finish the parking effect. Accordingly, by means of the bicycle stand separately assembled on the bicycle pedal, the risk of sudden moving-down of the bicycle stand due to jolting and vibration caused by riding on rough road on the way of bicycle driving can be avoided. Moreover, this invention is adaptable to the cases having pedal of various sizes by enabling the adjustment of the stand locating member.

DETAILED DESCRIPTION OF PREFERRED EMBODIMENTS

The objects, the technical contents and the expected effect of the present invention will become more apparent from the detailed description of the preferred embodiments in conjunction with the accompanying drawings.

Figure 1:
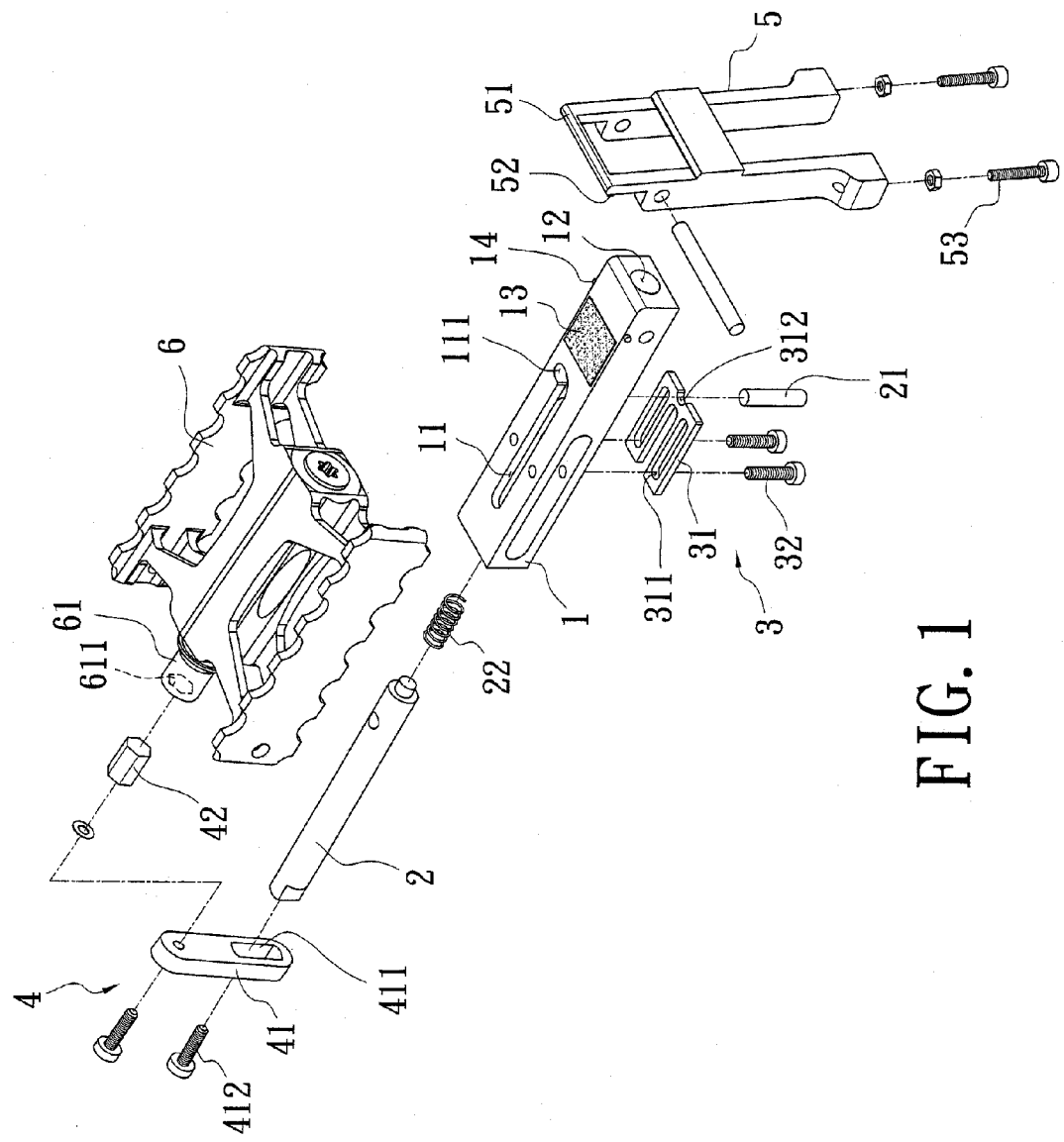
FIG. 1 is a perspective exploded view showing the external bicycle stand of the present invention.
Figure 2:
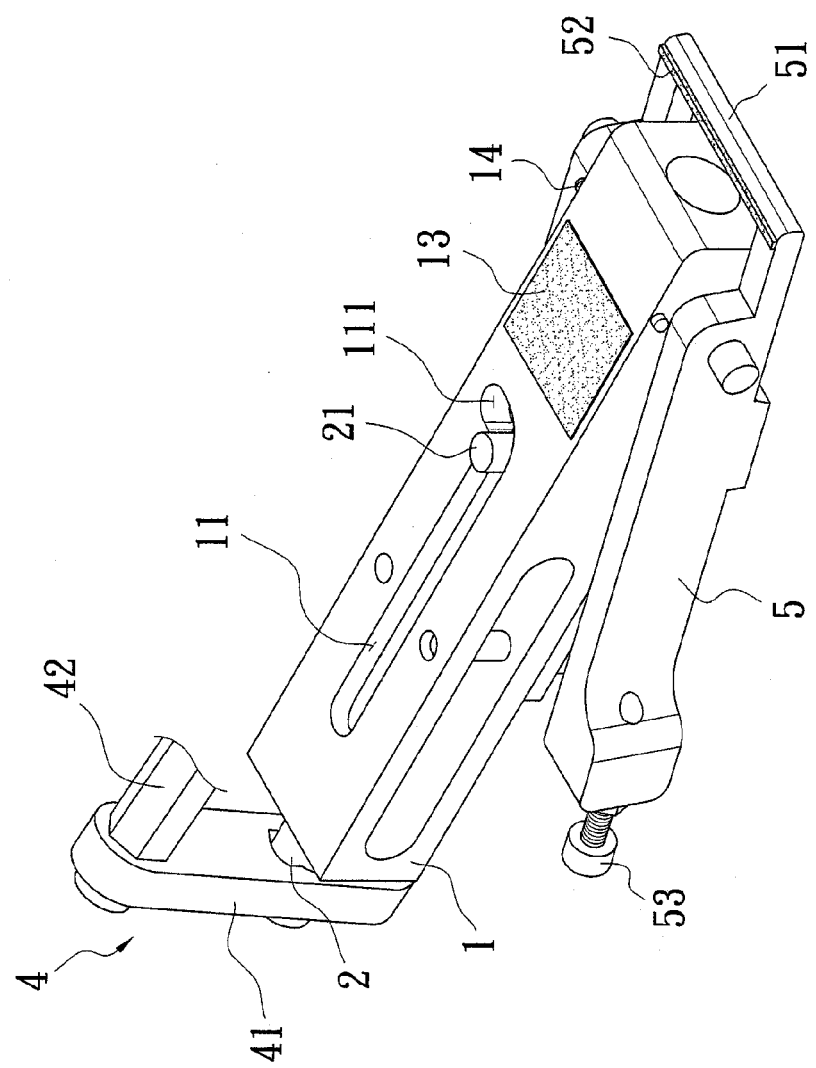
FIG. 2 is a perspective assembled front view showing the external bicycle stand of the present invention.

Firstly, referring to FIGS. 1 and 2, the external bicycle stand of the present invention is formed by a stand body (1), an axle (2), a locating member (3), an assembling member (4) and a support member (5).

The stand body (1) has a guiding groove (11) formed thereon and a 90 degree circular arc portion (111) for fixing provided on one end of the guiding groove (11). An axle bore (12) provided throughout the stand body from its front end to the rear end is communicated with the guiding groove (11), and the axle bore (12) is also communicated with the guiding groove (11). A rubber pad (13) is provided on the upper face of the stand body (1). Two stop posts (14) are provided on both flanks of the stand body (1) for blocking and locating of the move-down of the support member (5).

Figure 3:
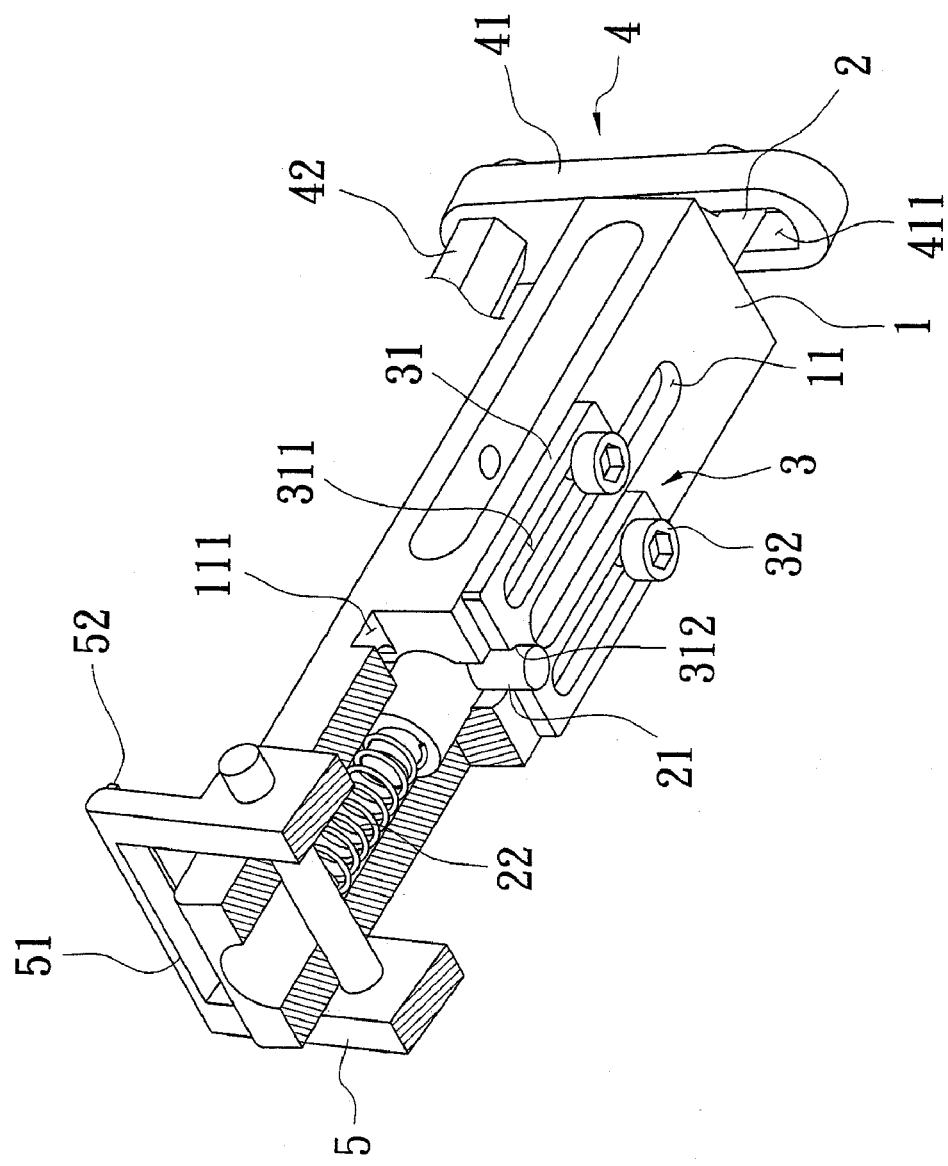
FIG. 3 is a perspective assembled bottom view showing the external bicycle stand of the present invention.

The axle (2) penetrates through the axle bore (12) of the stand body (1) and is abutted against an elastic element (22) provided within the axle bore (12), and a retaining pin (21) is provided on the axle (2) for fitting correspondingly in the guiding groove (11) of the stand body (1);

As shown in FIG. 3, the locating member (3) is disposed on a surface of the stand body (1) having the guiding groove (11) formed thereon, which includes an adjustment block (31) having an elongated slot (311) and two fasteners (32) to be fastened in the elongated slot (311) so as to fasten the adjustment block (31) to the stand body (1). An arc recess (312) is provided at one end of the adjustment block (31) for abutment with the retaining pin (21) of the axle (2).

The assembling member (4) includes a coupling piece (41) and a pin (42) in which an elongate hole (411) is provided on one end of the coupling piece (41) to accommodate one end of the axle (2) extending to the outside of the stand body (1). A fastener (412) is used to fasten the axle (2) together with the coupling piece (41) and the polygonal shape (hexagonal) pin (42) is inserted in the other end of the coupling piece (41).

The support member (5) is opposite to the assembling member (4) and is pivotably hinged to the other end of the stand body (1). An abutting portion (51) is formed on the upper edge of the support member (5) and a rubber pad (52) is combined on the abutting portion (51). Further, two support legs (53) capable of conducting telescopic adjustment are in threaded engagement on the bottom edge of the support member (5).

In implementation with the above structure, as shown in FIG. 3, the adjustment block (31) of the locating member (3) is adjusted to be located on suitable position on the stand body (1) according to the length of the bicycle pedal (6) to be assembled with the bicycle stand so as to adjust extendable length of the axle (2), in which the fasteners (32) of the adjustment block (31) is loosened first so as to adjust the adjustment block (31) to an appropriate position. Then, the fasteners (32) are fastened to fix the adjustment block (31) tightly on the stand body (1).

In this manner, when a bicycle has to be parked after a bicycle rider reaches his destination or wants to take a break in halfway, the bicycle stand is taken out and the pin (42) of the assembling member (4) is inserted in a polygonal recess (611) in the pivot shaft (61) of the bicycle pedal (6) so as to assemble the bicycle stand onto the pedal (6).

Figure 4:
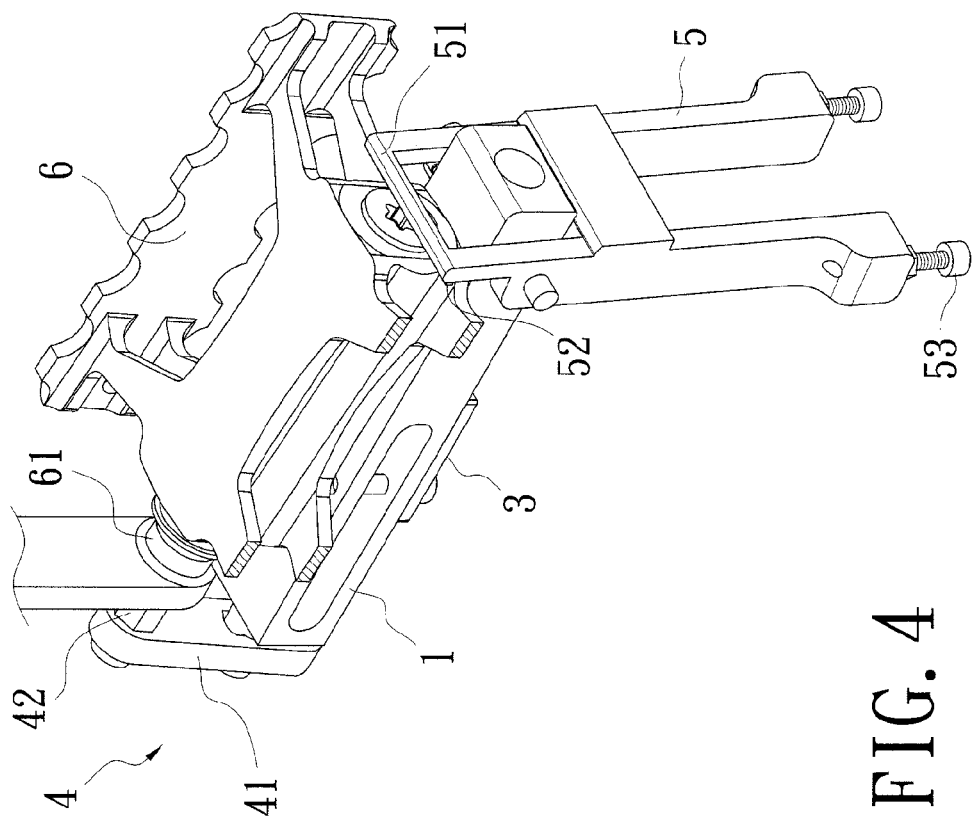
FIG. 4 is a perspective view showing the external bicycle stand of the present invention in usage state.

Referring to FIG. 4, now the stand body (1) is positioned under the pedal (6). In turn, the stand body (1) is extended in such a manner that it can completely bear the bottom of the pedal (6). At this moment, the retaining pin (21) of the axle (2) is sliding in the guiding groove (11) of the stand body (1). The retaining pin (21) is located in place after it reaches the arc recess (312) so that the pedal (6) can be completely born on the stand body (1).

Figure 5:
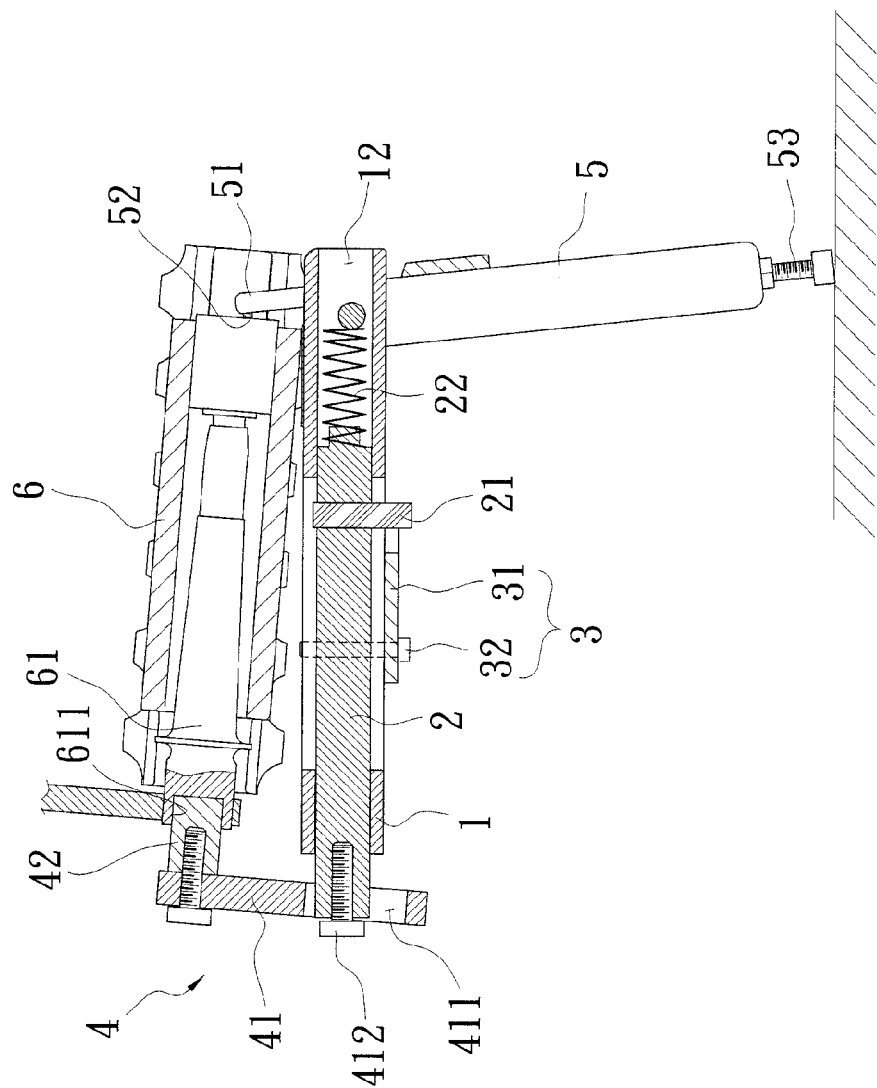
FIG. 5 is a sectional view showing the external bicycle stand of the present invention in usage status.

In turn referring to FIG. 5, the support member (5) pivotably hinged on the stand body (1) is moved down so as to vertically abut against ground, and the length of the support legs (53) is adjusted according to the distance of the pedal (6) to the ground so that the bicycle stand can support on ground appropriately so as to keep good stability of bicycle in parking.

Figure 6:
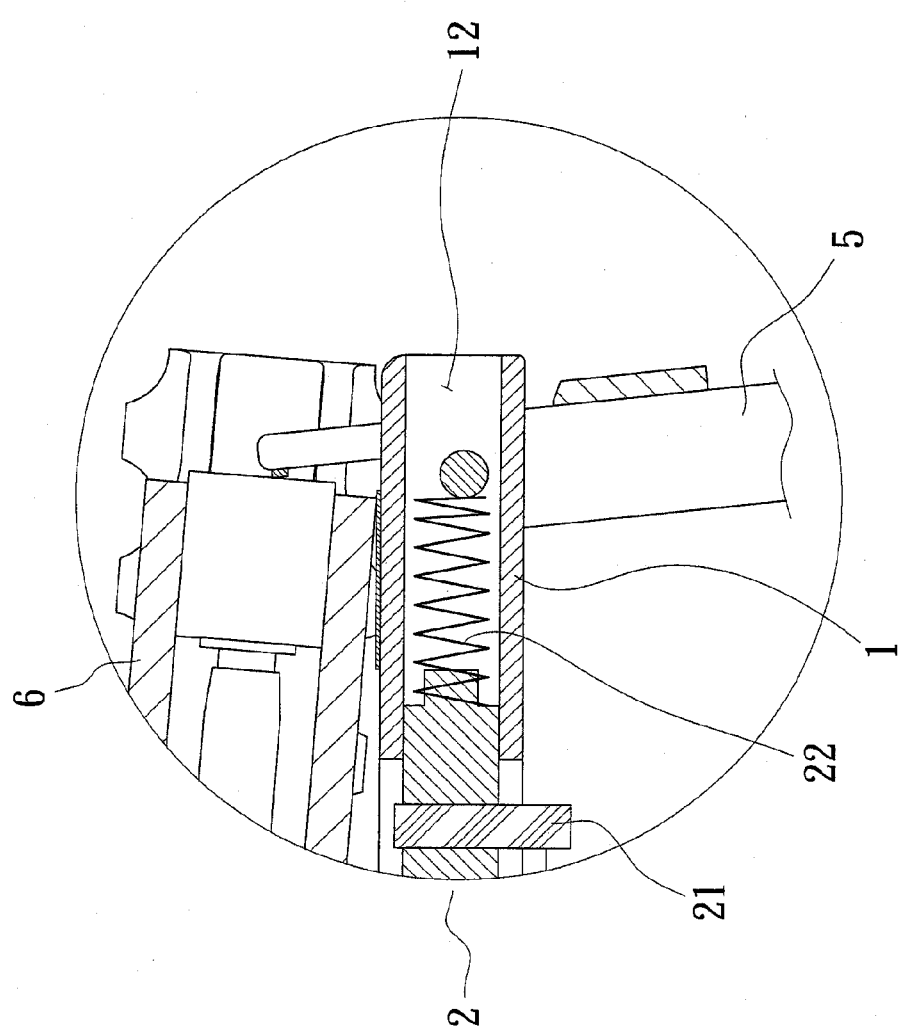
FIG. 6 is a partial enlarged sectional view showing the external bicycle stand of the present invention in usage state.

Referring to FIG. 6, it should be noted that rubber pads (13), (52) are respectively provided on the upper face of the stand body (1) and on the abutting portion (51) of the upper edge of the support member (5) so that the contact portions between the bicycle pedal (6) and the bicycle stand can be well protected by the rubber pads (13), (52) to avoid undesired wearing of the pedal (6).

In this way, the external bicycle stand separately assembled with the bicycle pedal (6) can provide great convenience for bicycle riders in parking, without the risk and inconvenience happened in conventional one in which sudden moving-down of the bicycle stand by itself often happens due to jolting and vibration caused by riding on rough road on the way of bicycle driving to cause bicycle riders endangered.

Figure 7:
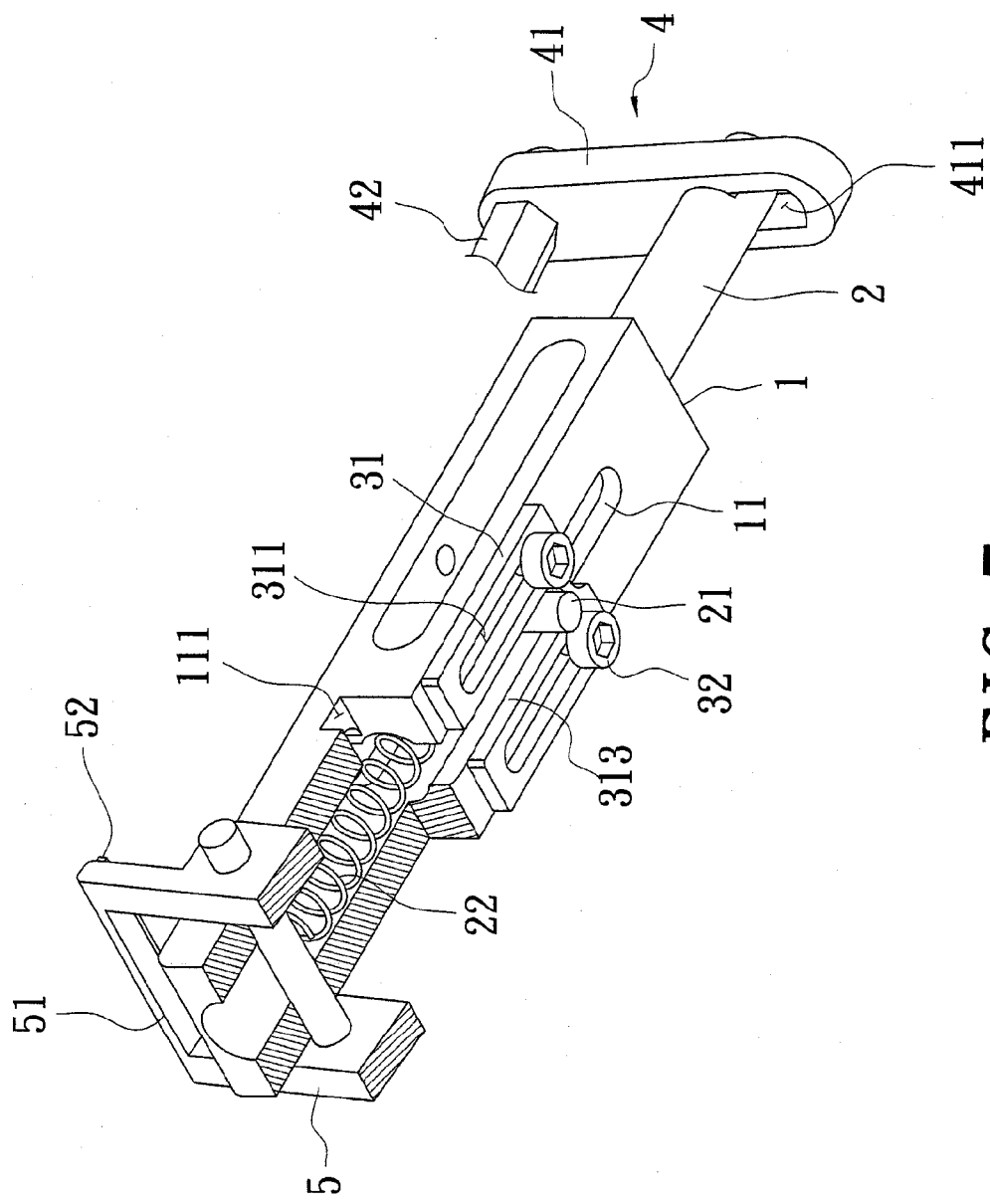
FIG. 7 is a perspective assembled bottom view showing another embodiment of the external bicycle stand of the present invention.

Furthermore, referring to FIG. 7, an elongate groove (313) is further formed on the other end of the adjustment block (31) opposite to the arc recess (312). In the case that the bicycle pedal (6) is longer, the end of the adjustment block (31) formed with the elongate groove (313) is directed toward the retaining pin (21) of the axle (2) so that the displacement stroke of the axle (2) can be increased. In this manner, the distance between the support member (5) and the assembling member (4) can be extended so that the bicycle stand can be adaptable to various length of bicycle pedal (6).

Figure 8:
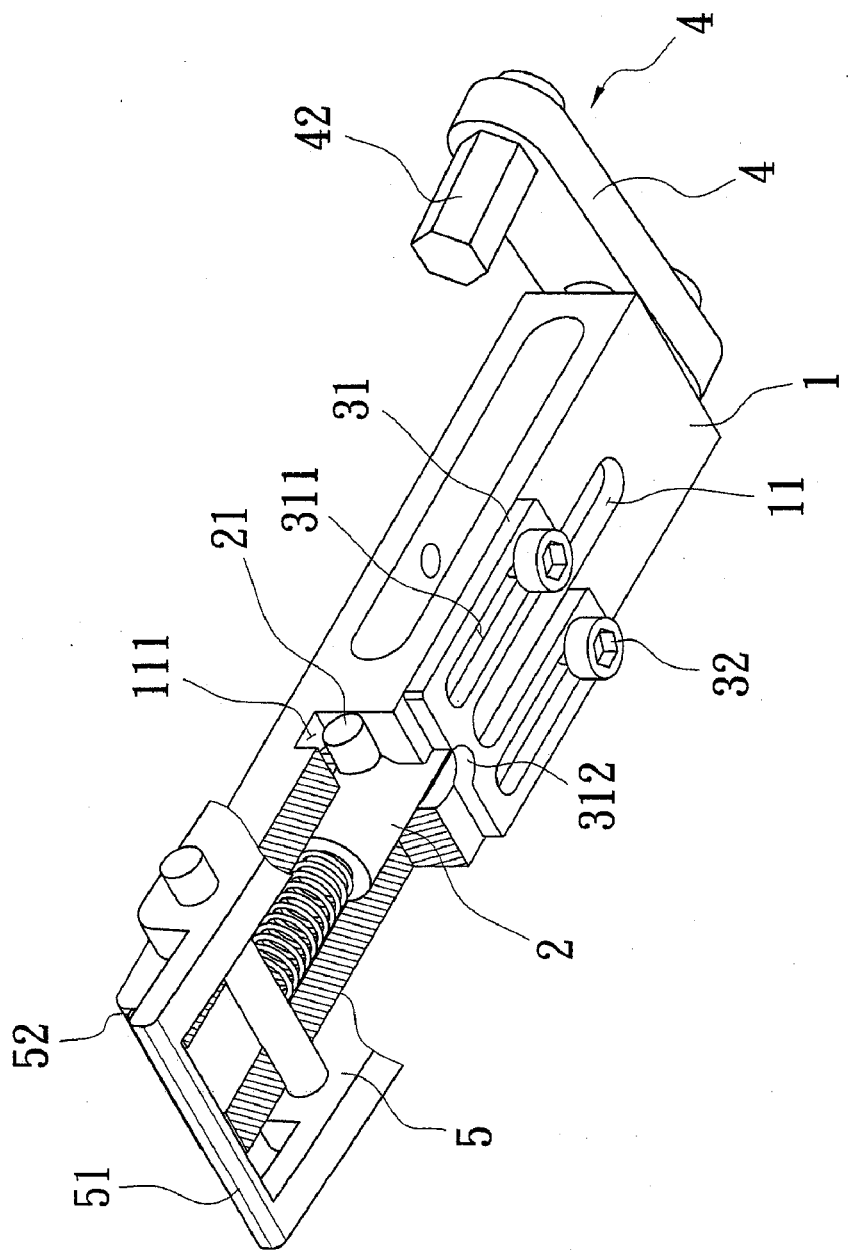
FIG. 8 is a view showing the external bicycle stand of the present invention in collapsed state.

When bicycle rider wants to ride bicycle again, as shown in FIG. 8, the bicycle stand is detached from the pedal and the axle (2) is received in the axle bore (12) of the stand body (1). At this moment, the retaining pin (21) of the axle (2) is moved along the guiding groove (11) of the stand body (1). After the retaining pin (21) is moved to the arc portion (111) for fixing at the end of the guiding groove (11), the axle (2) is rotated through a certain angle so that the retaining pin (21) is snap-fitted into the arc portion (111) for fixing perpendicular to the guiding groove (11) so as fix the axle (2) in place. Simultaneously, the assembling member (4) attached to the other end of the axle (2) is transformed from a state perpendicular to the stand body (1) to another state of parallel to the stand body (1) so as to shrink the volume of the bicycle stand. In this manner, the bicycle stand of the present invention can be received very conveniently in the carriage bag of bicycle or a special purpose carriage box.

It is apparent from the above structure and implementation, the present invention has the following advantages.

1. The bicycle stand of the present invention can be separately assembled on the bicycle pedal to achieve bicycle parking effect. In this manner, the risk of sudden move-down of the support rod of conventional bicycle stand, which is directly pre-assembled on the bicycle, due to jolting and vibration caused by riding on rough road on the way of bicycle driving can be avoided. Accordingly, not only the purpose of parking bicycle can be achieved but also convenience and safety in riding can also be assured.

2. The bicycle stand of the present invention can be adjusted as desired according to the pedal length of bicycle so that it is adaptable to bicycles of various brand and specifications.

3. The bicycle stand of the present invention has telescopic support legs assembled on the support member providing support on ground. In this manner, the support legs can be adjusted according to the distance between the bicycle pedal and ground so as to support the bicycle appropriately in stable and upright state.

4. In the bicycle stand of the present invention, rubber pads are respectively provided on the upper face of the stand body and on the abutting portion of the upper edge of the support member so that the contact portions between the bicycle pedal and the bicycle stand can be well protected by the rubber pads to avoid undesired wearing of the pedal.

5. The bicycle stand of the present invention can be transformed in shape properly according to usage and storage demand so that its volume can be shrunk for compact storage.

What is claimed is:

1. An external bicycle stand, comprising:
   a moving axle inserted in a stand body, said stand body further has a guiding groove provided thereon and an arc portion for fixing provided on one end of the guiding groove, an axle bore provided throughout the stand body for accommodating the axle therein and communicated with the guiding groove, a retaining pin provided on the axle for fitting correspondingly in the guiding groove of the stand body, a locating member assembled on the stand body for locating the axle, an assembling member connected on a first end of the axle extending to an outside edge of the stand body and engaged with a bicycle pedal, and a support member pivotably hinged on the stand body.

2. The external bicycle stand as claimed in claim 1, wherein said locating member is disposed on a surface of the stand body having guiding groove formed thereon, which includes an adjustment block having an elongated slot formed thereon and a fastener locked in the elongated slot so as to fasten the adjustment block to the stand body.

3. The external bicycle stand as claimed in claim 2, wherein said adjustment block is further formed with an arc recess at one end thereof for abutment with the retaining pin of the axle.

4. The external bicycle stand as claimed in claim 3, wherein said adjustment block is further formed with an elongate slot at a second end of the adjustment block opposite the arc recess.

5. The external bicycle stand as claimed in claim 4, wherein two stop-posts are provided on both flanks of said stand body for blocking and locating of said support member.

6. The external bicycle stand as claimed in claim 5, wherein said support member further has a rubber pad combined on an abutment portion formed on an upper edge of the support member.

7. The external bicycle stand as claimed in claim 6, wherein said stand body further has a rubber pad combined on an upper side face thereof.

8. The external bicycle stand as claimed in claim 2, wherein said adjustment block is further formed an elongate groove for accommodating the retaining pin of the axle therein.

9. The external bicycle stand as claimed in claim 1, wherein said assembling member further includes a coupling piece and a coupling pin, in which a first end of the coupling piece is connected with the first end of the axle extending to the outside of the stand body and the coupling pin is inserted at a second end of the coupling piece.

10. The external bicycle stand as claimed in claim 9, wherein an elongate hole is further provided on the first end of the coupling piece connecting to the axle to accommodate the first end of the axle extending to the outside of the stand body, and a fastener is further provided to fasten the axle together with the coupling piece.

11. The external bicycle stand as claimed in claim 10, wherein said coupling pin is in polygonal shape.

12. The external bicycle stand as claimed in claim 11, wherein an abutment portion is further formed on an upper edge of the support member, and two support legs capable of telescopic adjustment are further in engagement on a bottom edge of the support member.

13. The external bicycle stand as claimed in claim 1, wherein two stop-posts are provided on both flanks of the stand body for blocking and locating of said support member.

14. The external bicycle stand as claimed in claim 1, wherein an abutment portion is further formed on an upper edge of the support member, and two support legs capable of telescopic adjustment are further in engagement on a bottom edge of the support member.

15. The external bicycle stand as claimed in claim 1, wherein an elastic element is further provided between said stand body and said axle.

16. An external bicycle stand, comprising:
a moving axle inserted in a stand body,
a locating member assembled on the stand body for locating the axle,
an assembling member connected on a first end of the axle extending to an outside edge of the stand body and engaged with a bicycle pedal, said assembling member further includes a coupling piece and a coupling pin, in which one end of the coupling piece is connected with the first end of the axle extending to the outside of the stand body and the coupling pin is inserted at a second end of the coupling piece, and
a support member pivotably hinged on the stand body.

17. The external bicycle stand as claimed in claim 16, wherein an elongate hole is further provided on the first end of the coupling piece connecting to the axle to accommodate the first end of the axle extending to the outside of the stand body, and a fastener is further provided to fasten the axle together with the coupling piece.

18. The external bicycle stand as claimed in claim 16, wherein said coupling pin is in polygonal shape.

19. The external bicycle stand as claimed in claim 16, wherein an abutment portion is further formed on an upper edge of the support member, and two support legs capable of telescopic adjustment are further in engagement on a bottom edge of the support member.

* * * * *